2,810,683

PRODUCTION OF ELEMENTAL BORON BY FUSED SALT ELECTROLYSIS

Richard B. Ellis, Birmingham, Ala., assignor to Callery Chemical Company, Pittsburgh, Pa., a corporation of Pennsylvania No Drawing. Application September 16, 1954, Serial No. 456,634

6 Claims. (Cl. 204—60)

This invention relates to the production of elemental boron and particularly to its production by the electrolysis of a fused salt mixture containing boron and phosphate compounds.

Amorphous boron was first obtained by Moissan in 1892 by the reduction of boric oxide with magnesium. Others have prepared elemental boron by electrolysis of fused oxide and borate baths or by the thermal reduction of fluoborates with alkali metals or magnesium. Goss in U. S. Patent 2,415,946 describes a method for making boron from boron trichloride and hydrogen starting with sodium chloride, borax, and carbon, but this procedure is cumbersome and numerous by-products are formed. Cooper in U. S. Patent 2,572,249 describes the production of boron of high purity by electrolysis of a fused bath of potassium chloride or fluoride, potassium fluoborate, and boric oxide at temperatures of 650°–1000° C.

It is an object of this invention to provide a new and improved method for producing elemental boron which is simple and economical to use and which does not form objectionable by-products.

Another object is to provide an electrolytic method for producing elemental boron which utilizes various phosphate mixtures as electrolytes and much lower operating temperatures than any other previous method.

Other objects of this invention will become apparent throughout the specification and claims hereinafter related.

This new and improved method will be more fully described in the specification and the novelty thereof will be particularly pointed out and distinctly claimed.

This invention is based upon the discovery that a mixture of metaphosphoric acid and certain phosphate salts will dissolve an appreciable amount of boric oxide and yet melt at temperatures of about 250° C. When these mixtures are electrolyzed elemental boron is collected at the cathode. Such a process results in a substantial saving because of the lower temperatures and cheap salt mixtures used.

In one experiment 185 g. of electrolyte containing 80% by weight of metaphosphoric acid ($HPO_3$), 15% by weight of sodium metaphosphate ($NaPO_3$), and 5% by weight of ammonium fluoborate ($NH_4BF_4$) were melted and 7 g. of boric oxide ($B_2O_3$) were dissolved in this mixture at about 250° C. This melt was electrolyzed between a graphite anode and a copper rod cathode. A potential of 2 volts was applied and the mixture electrolyzed for about three hours. A variety of current densities were used and no critical or limiting value was discovered. At the end of that time the cathode was found to be covered with a deposit consisting of a tightly adhering black substance and a loosely adhering gray substance. The black substance was scraped off and found to contain about 25% by weight of boron, the remainder being mostly copper.

In another experiment under similar conditions boron was deposited on a copper cathode from a melt comprising 50 wt. percent metaphosphoric acid ($HPO_3$), 45 wt. percent potassium dihydrogen phosphate ($KH_2PO_4$), and 5 wt. percent ammonium fluoborate ($NH_4BF_4$), containing about 2 wt. percent dissolved boric oxide ($B_2O_3$). This composition was found to melt at about 200° C.

In still another experiment a composition melting at 250° C. was prepared consisting of 40 wt. percent potassium dihydrogen phosphate ($KH_2PO_4$), 40 wt. percent metaphosphoric acid ($HPO_3$), and 20 wt. percent potassium fluoborate ($KBF_4$). About 2 wt. percent boric oxide ($B_2O_3$) was dissolved in this melt and electrolysis carried out as above described. A deposit of boron on the cathode was obtained substantially the same as that described in the first experiment.

Other mixtures of metaphosphoric acid and alkali metal metaphosphates may be used as well as additions or substitutions of other phosphates such as alkali metal orthophosphates or acid orthophosphates. The ammonium fluoborate is added to increase the solubility of boric oxide but other fluoborates may also be used. The particular compositions cited in the foregoing experiments gave the lowest operating temperatures. The electrolysis may be carried out using other electrodes.

The boron produced by this process has numerous useful applications. One important use is in explosive compositions because of the high combustibility of boron. Another use of boron is in the manufacture of temperature responsive electrical resistors. Since fused boron is extremely hard it can also be used on tips for boring tools and grinding instruments.

Although several of the best embodiments of this invention have been described as required by the Patent Laws it is to be understood that within the scope of the appended claims this invention may be practiced otherwise than as specifically described.

Thus, what is desired to be claimed and secured by Letters Patent of the United States is:

1. A method of producing elemental boron which comprises electrolyzing a fused mixture consisting essentially of metaphosphoric acid, an alkali metal phosphate, and a fluoroborate of the group consisting of potassium fluoroborate and ammonium fluoroborate, in proportions such that the mixture melts below about 250° C., the mixture containing at least about 2 percent by weight of dissolved boric oxide, and recovering the boron deposited at the cathode.

2. A method according to claim 1 in which the alkali metal phosphate is the metaphosphate.

3. A method according to claim 1 in which the alkali metal phosphate is the orthophosphate.

4. A method of producing elemental boron which comprises electrolyzing a fused mixture of about 2% by weight of boric oxide in an electrolyte comprising 80% by weight of metaphosphoric acid, 15% by weight of sodium metaphosphate and 5% by weight of ammonium fluoborate, at a temperature of 250° C., using a graphite anode and a copper cathode and recovering the boron deposited at the cathode.

5. A method of producing elemental boron which comprises electrolyzing a fused mixture of 5.0 wt. percent metaphosphoric acid, 45 wt. percent potassium dihydrogen phosphate, and 5 wt. percent ammonium fluoborate, containing about 2 wt. percent boric oxide, at a temperature of about 200° C., using a graphite anode and a copper cathode, and recovering the boron deposited at the cathode.

6. A method of producing elemental boron which comprises electrolyzing a fused mixture of 40 wt. percent metaphosphoric acid, 40 wt. percent potassium dihydrogen phosphate, and 20 wt. percent potassium fluoborate, containing about 2 wt. percent boric oxide, at a temperature of about 250° C., using a graphite anode and a copper cathode, and recovering the boron deposited at the cathode.

References Cited in the file of this patent

UNITED STATES PATENTS 2,572,249     Cooper _____ Oct. 23, 1951

FOREIGN PATENTS 638,345     France _____ Feb. 20, 1928
162,655     Great Britain _____ Apr. 30, 1920

OTHER REFERENCES

Transactions of the American Electrochemical Society, vol. 47 (1925), pages 30–33.